(12) United States Patent
Abe et al.

(10) Patent No.: US 7,740,797 B2
(45) Date of Patent: Jun. 22, 2010

(54) PHOTO-SHAPING METHOD, PHOTO-SHAPING SYSTEM, AND PHOTO-SHAPING PROGRAM

(75) Inventors: Satoshi Abe, Moriguchi (JP); Hirokazu Shinkai, Neyagawa (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 529 days.

(21) Appl. No.: 11/577,933

(22) PCT Filed: Oct. 21, 2005

(86) PCT No.: PCT/JP2005/019831
§ 371 (c)(1),
(2), (4) Date: Apr. 25, 2007

(87) PCT Pub. No.: WO2006/046671
PCT Pub. Date: May 4, 2006

(65) Prior Publication Data
US 2008/0286139 A1    Nov. 20, 2008

(30) Foreign Application Priority Data
Oct. 26, 2004   (JP) .......................... P2004-311506

(51) Int. Cl.
*B22F 3/10* (2006.01)
(52) U.S. Cl. .................... 419/58; 219/121.63
(58) Field of Classification Search ............. 219/121.6, 219/121.63; 419/58; 148/301
See application file for complete search history.

(56) References Cited
U.S. PATENT DOCUMENTS
6,144,008 A    11/2000   Rabinovich

| 6,459,069 | B1 | 10/2002 | Rabinovich |
| 6,657,155 | B2 | 12/2003 | Abe et al. |
| 7,172,724 | B2 | 2/2007 | Abe et al. |
| 2002/0041818 | A1* | 4/2002 | Abe et al. .................... 419/7 |

(Continued)

FOREIGN PATENT DOCUMENTS

DE    10148967    4/2002

(Continued)

OTHER PUBLICATIONS

English language Abstract of JP 2000-073108, Mar. 2000.

(Continued)

*Primary Examiner*—Scott Kastler
(74) *Attorney, Agent, or Firm*—Greenblum & Bernstein, P.L.C.

(57) ABSTRACT

In photo-shaping a target object executed by a photo-shaping machine (10) along with a computing device (1), a first path (P1) is generated as a light beam irradiation path on the basis of contour data of each section sliced at a specified pitch of three-dimensional CAD model data of the target object desired to be formed, and the first parameter data. A second path (P2) is generated as a removal processing path on the basis of the three-dimensional CAD model data, the second parameter data, and removing timing data showing a timing of executing the removal process. Driving programs (P3) are generated for executing the photo-shaping process including the light beam irradiation and the removal process, on the basis of the first path data, second path data and removing timing data, thereby performing the photo-shaping and removal process according to the driving programs.

11 Claims, 20 Drawing Sheets

U.S. PATENT DOCUMENTS

| | | |
|---|---|---|
| 2003/0185697 A1 | 10/2003 | Abe et al. |
| 2004/0155384 A1 | 8/2004 | Sievers et al. |
| 2004/0217095 A1 | 11/2004 | Herzog |
| 2004/0228754 A1 | 11/2004 | Abe et al. |
| 2005/0029711 A1 | 2/2005 | Abe et al. |
| 2006/0192322 A1 | 8/2006 | Abe et al. |
| 2006/0208396 A1 | 9/2006 | Abe et al. |

FOREIGN PATENT DOCUMENTS

| | | |
|---|---|---|
| EP | 1348506 | 10/2003 |
| JP | 2000-073108 | 3/2000 |
| JP | 2001-277369 | 10/2001 |
| JP | 2002-115004 | 4/2002 |
| WO | 02/094482 | 11/2002 |
| WO | 03/045669 | 6/2003 |

OTHER PUBLICATIONS

English language Abstract of DE 101 48 967.
English language Abstract of JP 2002-115004, Apr. 2002.
English language Abstract of JP 2001-277369, Oct. 2001.
U.S. Appl. No. 11/569,261 to Higashi et al., filed Nov. 17, 2006.

* cited by examiner

FIG.2A

| PHOTO-SHAPING MACHINE NAME | Machine-#1 |
|---|---|
| MAXIMUM FORMING SHAPE SIZE | 600×350×250 (mm) |
| MAXIMUM LASER OUTPUT | ****Kw |
| MAXIMUM SCANNING SPEED | ****mm/s |

FIG.2B

| POWDER MATERIAL | **** | IRRADIATION DIAMETER | 0.5 | | |
|---|---|---|---|---|---|
| SLICE PITCH | SECTION REGION | SPEED | IRRADIATION PATTERN | IRRADIATION ALLOWANCE | IRRADIATION INTERVAL |
| 1~1.2 | 0.1 | 0.1 | ENTIRE SURFACE | 0.5 | 1 |
| 1.2~1.5 | 0.15 | 0.15 | ENTIRE SURFACE | 1 | 2 |
| 1.5~2.0 | 0.2 | 0.2 | BLOCK SURFACE | 2 | 2 |

| TOOL NUMBER | UNDULATION CURVATURE | HORIZONTALITY | VERTICALITY |
|---|---|---|---|
| 1 | >30 | 0 | 0 |
| 1 | 0 | <5 | 0 |
| 2 | <10 | <5 | 0 |

| WORK MATERIAL | ** | TOOL MATERIAL | * | |
|---|---|---|---|---|
| TOOL DIAMETER | UNDERHEAD LENGTH | PRIORITY | TYPE | *** |
| φ0.3 | 10 | 3 | BALL | *** |
| φ0.5 | 20 | 2 | FLAT | *** |
| φ1.0 | 30 | 1 | FLAT | *** |

PHOTO-SHAPING METHOD, PHOTO-SHAPING SYSTEM, AND PHOTO-SHAPING PROGRAM

TECHNICAL FIELD

The present invention relates to a photo-shaping technique of manufacturing a three-dimensional object from powder material, and more particularly to a photo-shaping method of obtaining a target three-dimensional object by removing an outer face of a three-dimensional object presently formed during repetition of forming sintered layers by irradiating a light beam onto a specified position of a powder material layer to sinter the powder layer, and to a photo-shaping system and a photo-shaping program for implementing the photo-shaping method.

BACKGROUND ART

A conventional photo-shaping method is disclosed in Japanese Patent Application Laid-Open Publication No. 2002-115004 (patent document 1). In this method, a light beam is irradiated onto a specified position of a powder material layer to sinter (including a case of once melt) a corresponding portion of the powder material layer to form a sintered layer. The sintered layer is then covered with a new powder material layer, and a light beam irradiated onto a specified position thereof to sinter a corresponding portion of the new powder material layer, thereby forming a new sintered layer integrally united with the underlying sintered layer. While repeating this process of forming the sintered layers, the outer face of a formed body obtained by laminating the sintered layers is subject to removal process during repetitive steps of forming the sintered layers.

In this conventional photo-shaping method, as disclosed in patent document 1, on the basis of STL model data obtained from three-dimensional CAD model data of a three-dimensional object to be created, processing paths of light beam irradiating means and removal processing means are calculated for carrying out the light beam irradiation process and removal process by the two means, so that the light beam irradiating means and removal processing means are driven based on the obtained processing path data.

In this processing, the processing path used in the removing process (i.e., second path) to be inserted in laminating the sintered layers to form an object can be obtained by sequentially specifying a processing range in a height (vertical) direction even in the conventional CAD. However, when the number of divisions increases in the height direction, it takes much labor and time, and operator's errors are likely to occur.

For example, in the case of performing the removing process when laminating every 10 layers at laminating pitch of 0.05 mm, if the height of formed body is 100 mm, the number of divisions is 200, and if five types of removing tools are used, the total number of divisions becomes 1000. If the second path is calculated by such number of times in setting and entering the height range, this leads operator's labor to be excessive, and errors are likely to occur. Besides, a program must be generated by arranging such number of second paths in the order of processing, and must be transferred to the removal processing means, and this job also takes much time and labor when manually done.

DISCLOSURE OF INVENTION

In order to solve the above problems in the prior art, the present invention has been made and an object thereof is to provide a photo-shaping method, a photo-shaping system, and a photo-shaping program capable of performing photo-shaping efficiently including removing process during repetitive steps of laminating sintered layers.

To achieve the object, the invention provides a photo-shaping method which includes a process of photo-shaping a target object executed by a photo-shaping machine along with a computing process executed by a computing device, said photo-shaping process including a step of irradiating a light beam to a specified position of a powder material layer to sinter a desired part of the powder material to form a sintered layer, covering the sintered layer with a new powder material layer, irradiating a light beam to a specified position of the new powder material layer to sinter a desired part of the new powder material powder to form a new sintered layer integral with the underlying sintered layer, repeating the process of forming the sintered layers in lamination, and including a step of removing an outer face of a formed body of the sintered layers in lamination during the repetitive forming process of the sintered layers.

The method is characterized in that the computing process executed by the computing device comprises the steps of: storing first parameter data of various parameters in the first parameter database for the light irradiation process in the photo-shaping process; storing second parameter data of various parameters in the first parameter database for the removal process; generating a first path as a light beam irradiation path for the light irradiation process, on the basis of contour data of each section sliced at a specified pitch of three-dimensional CAD model data of the target object desired to be formed, and the first parameter data stored in the first parameter database; generating a second path as a removal processing path for the removal process, on the basis of the three-dimensional CAD model data, the second parameter data stored in the second parameter database, and removing timing data showing a timing of executing the removal process; generating driving programs for driving the photo-shaping machine for executing the photo-shaping process including the light beam irradiation and the removal processes, on the basis of the first path data, second path data and removing timing data, thereby performing the photo-shaping and removal process according to the driving programs.

The invention further provides a photo-shaping system which includes a photo-shaping machine for photo-shaping a target object along with a computing device, said photo-shaping machine having a light irradiation means irradiating a light beam to a specified position of a powder material layer to sinter a desired part of the powder material to form a sintered layer, covering the sintered layer with a new powder material layer, irradiating a light beam to a specified position of the new powder material layer to sinter a desired part of the new powder material powder to form a new sintered layer integral with the underlying sintered layer, repeating the process of forming the sintered layers in lamination, and having a removal processing means removing an outer face of a formed body of the sintered layers in lamination during the repetitive forming process of the sintered layers.

The system is characterized in that said computing device comprises: a first parameter database storing various parameters for use in the photo-shaping process executed by the light irradiation means; a second parameter database storing various parameters for use in the removal process executed by the removal processing means; first path generating means for generating a first path as a light beam irradiation path for the light irradiation means, on the basis of contour data of each section sliced at a specified pitch of three-dimensional CAD model data of the target object desired to be formed, and the parameter data stored in the first parameter database; second path generating means for generating a second path as a removal processing path for the removal processing means, on the basis of the three-dimensional CAD model data, parameter data stored in the second parameter database, and removing timing data showing a timing of executing the removal process; driving program generating means for generating driving programs for driving the photo-shaping machine and the removal processing means, on the basis of the first path data, second path data and removing timing data, whereby the photo-shaping machine and the removal processing means perform the photo-shaping and removal process according to the driving programs.

The second path generating means may determine a removing tool to be used in the removal processing means on the basis of the three-dimensional CAD model data and parameter data in the second parameter database. Therefore, removing process can be performed by using a proper tool suited to the model shape.

The second path generating means, preferably, generates removing timing data on the basis of the three-dimensional CAD model data and parameter data in the second parameter database, and the parameter data referred to in this generation contains data relating to downward overlapping amount of depth of cutting. Therefore, appropriate removing timing can be set automatically according to the tool shape, and as compared with the case of removing always at the same removing timing, the number of times of removing can be decreased making efficient use of a length of cutting teeth of the tool, the number of times of exchange of tools can be decreased, and the overlap amount is decreased, and wasteful passes are saved, and the processing time can be shortened.

When the second path generating means divides the second path generated on the entire object model, in the height direction at removing timing, the time-consuming recognition process of model shape is required only once, and the computing processing time can be shortened.

In this case, preferably, the second path generating means generates an aerial route path consecutively connecting adjacent second paths, and also generates an aerial route path by ignoring the shape above the object range of the second path being generated. Thus, wasteful interference check can be omitted, and the computing processing time can be further shortened.

The second path generating means may divide the three-dimensional CAD model in height direction according to predetermined removing timing data, and generate a second path on the basis of the divided model shapes, and parameter data in the second parameter database containing various parameters for removing process. Thus, an optimum removing tool can be used for each divided model, and wasteless second paths can be obtained.

The second path generating means may make a model of excess hardened portion generated when forming, and determine the obtained excess hardened model as removing range, and generate a second path on this removing range. Thus, more efficient second paths can be obtained.

The second path generating means may determine the removing range in a region between the lowest contour of the range specified by removing timing, and offset contour being offset from this contour to outer side by a specified amount, and generate a second path on this removing range. In this case, more efficient second paths can be obtained.

If the second path generating means generates a second path in each region not consecutive among divided models, and generates an aerial route path linking these second paths, it is easy to recognize a portion of so-called island, and wasteless aerial route paths can be obtained.

The second path generating means, preferably, determines a contact start position with the model depending on the tool shape contained in the second parameter database in the removal processing means as cutting means, and generates a second path on the basis of this position. Second paths can be obtained with almost no miss-hitting, and the removing time can be shortened.

The invention further provides a photo-shaping program of creating driving programs executed by a computer for executing a process of photo-shaping a target object executed by a photo-shaping machine along with a computing process, said photo-shaping process including a step of irradiating a light beam to a specified position of a powder material layer to sinter a desired part of the powder material to form a sintered layer, covering the sintered layer with a new powder material layer, irradiating a light beam to a specified position of the new powder material layer to sinter a desired part of the new powder material powder to form a new sintered layer integral with the underlying sintered layer, repeating the process of forming the sintered layers in lamination, and including a step of removing an outer face of a formed body of the sintered layers in lamination during the repetitive forming process of the sintered layers.

The program is characterized in that the computing process executed by the computer comprises the steps of: storing first parameter data of various parameters in the first parameter database for the light irradiation process; storing second parameter data of various parameters in the first parameter database for the removal process; generating a first path as a light beam irradiation path for the light irradiation process, on the basis of contour data of each section sliced at a specified pitch of three-dimensional CAD model data of the target object desired to be formed, and the first parameter data stored in the first parameter database; generating a second path as a removal processing path for the removal process, on the basis of the three-dimensional CAD model data, the second parameter data stored in the second parameter database, and removing timing data showing a timing of executing the removal process; generating driving programs for driving the photo-shaping machine for executing the photo-shaping process including the light beam irradiation and the removal processes, on the basis of the first path data, second path data and removing timing data, thereby performing the photo-shaping and removal process according to the driving programs.

According to the present invention, the first path and second path can be obtained from the parameter data stored in the first parameter database containing various parameters for photo-shaping, parameter data stored in the second parameter database containing various parameters for removal process, removing timing data, and model data, and capable of obtaining driving programs for executing these first path and second path sequentially. Thus, operator's labor and time of executing processes of photo-shaping can be substantially saved, and processes of photo-shaping can be executed efficiently by executing the removal process during repetitive steps of laminating sintered layers.

BRIEF DESCRIPTION OF DRAWINGS

FIGS. 2A, 2B are explanatory diagrams of parameter data contained in a first parameter database.

FIGS. 4A, 4B are explanatory diagrams of model data to be taken in.

BEST MODE FOR CARRYING OUT THE INVENTION

This application is based on Japanese patent application No. 2004-311506 (now granted as Japanese patent 3687677) filed on Oct. 26, 2004 in Japan, the content of which is herein expressly incorporated by reference in its entirety.

Figure 20A:
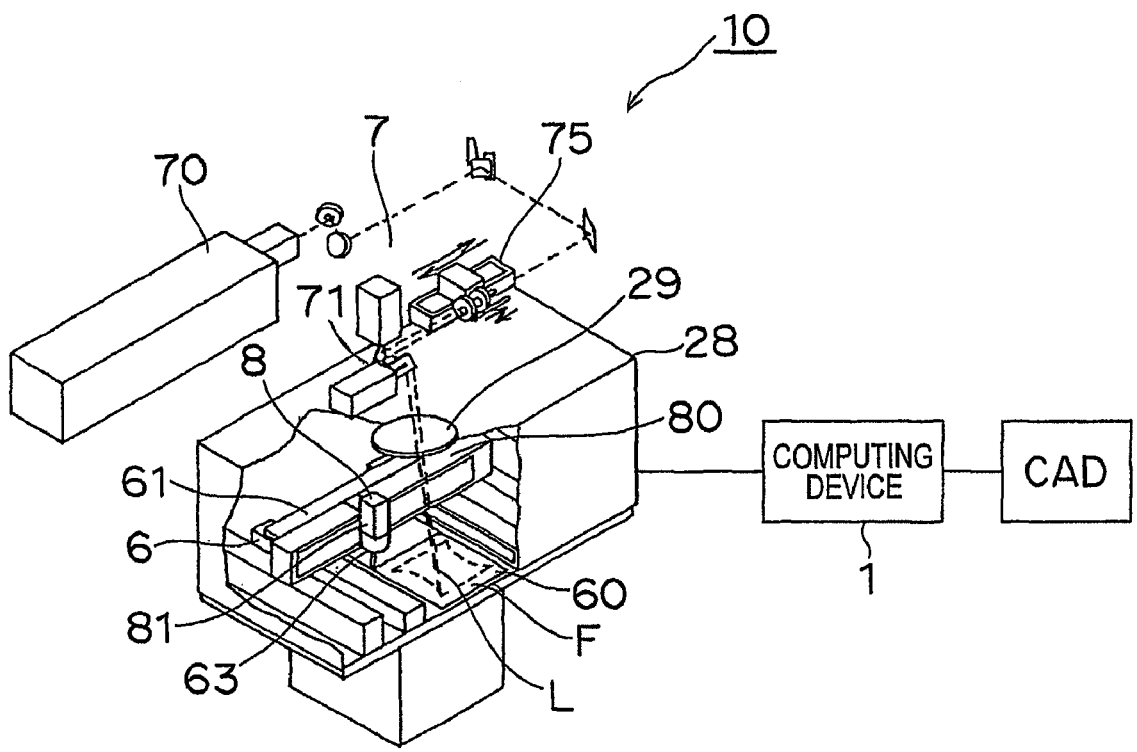
FIG. 20A is a cut-away perspective view of an example of a photo-shaping machine, and 20B is a partial perspective view thereof.
Figure 20B:
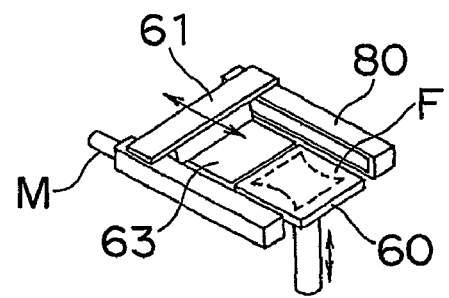

The following describes a preferred embodiment of the present invention with reference to the accompanying drawings. FIGS. 20A and 20B show an example of a photo-shaping system according to the present invention which mainly includes a photo-shaping machine 10, a computing device 1 and a CAD (computer aided design) portion, together with other peripheral devices. The photo-shaping machine 10 per se is similar to that disclosed in Patent document 1. More specifically, the photo-shaping machine 10 includes powder layer forming means 6, light beam irradiating means 7, removal processing means 8, and a chamber 28 which incorporates the powder layer forming means 6, removal processing means 8 and others in its inside. The powder layer forming means 6 feeds metal powder from a powder tank 63 onto a stage 60 which is driven up and down by moving a cylinder within a space surrounded on the outer circumference. The supplied metal powder is uniformly layered by a squeezing blade 61 to form a powder layer F having a specified thickness on the stage 60.

The light beam irradiating means 7 irradiates laser beams emitted from a laser oscillator 70 to the powder layer F by way of a scanning optical system composed of a beam shape correcting portion 75, a galvano-mirror 71 and the like. The light beam irradiating means 7 is disposed outside the chamber 28, and the light beam from the light beam irradiating means 7 is irradiated onto the powder layer F through a light permeable window 29 provided in the chamber 28. The removal processing means 8 has a milling head 81 provided on an XY drive mechanism 80 above a base portion of the powder layer forming means 6.

Metal powder overflowing from the powder tank 63 is supplied onto the base surface of the stage 60 and is simultaneously leveled uniformly by the blade 61 to form a first layer of the powder layer F. A light beam such as laser beam LB is irradiated onto a desired portion of the powder layer F to be hardened, so that the metal powder is sintered to form a first sintered layer which is integrally united with the base portion. Then, the stage 60 is slightly lowered, and metal powder is newly supplied from the powder tank 63 again and leveled by the blade 61, so that a second powder layer F is formed on both the first powder layer F and the first sintered layer. A light beam such as laser beam LB is irradiated onto a desired portion of the second powder layer F to be hardened, and the powder is sintered to form a second sintered layer which is integrally united with the underlying first sintered layer.

By repeating the above process of forming a new powder layer F while lowering the stage 60 and irradiating a light beam to a specified position to form a sintered layer, a plurality of sintered layers are stacked up in lamination. When the thickness of the laminated sintered layers reaches a predetermined value previously specified in accordance with, e.g., a tool length of the milling head 81 of the removal processing means 8, the removal processing means 8 is once driven to cut off the surface (i.e., milling the side face) of the formed body stacked up to now, and the outer face thereof is thus subject to removal processing so that the whole surface thereof is finished.

Preferably, substantially spherical iron powder with grain size of 10 to 100 um can be used as the powder, and carbon dioxide laser beam can be used as the light beam, but the invention is not limited to use them. Also, the removal processing means 8 is not limited to use the milling head 81 and other cutting means may be used.

Figure 1A:
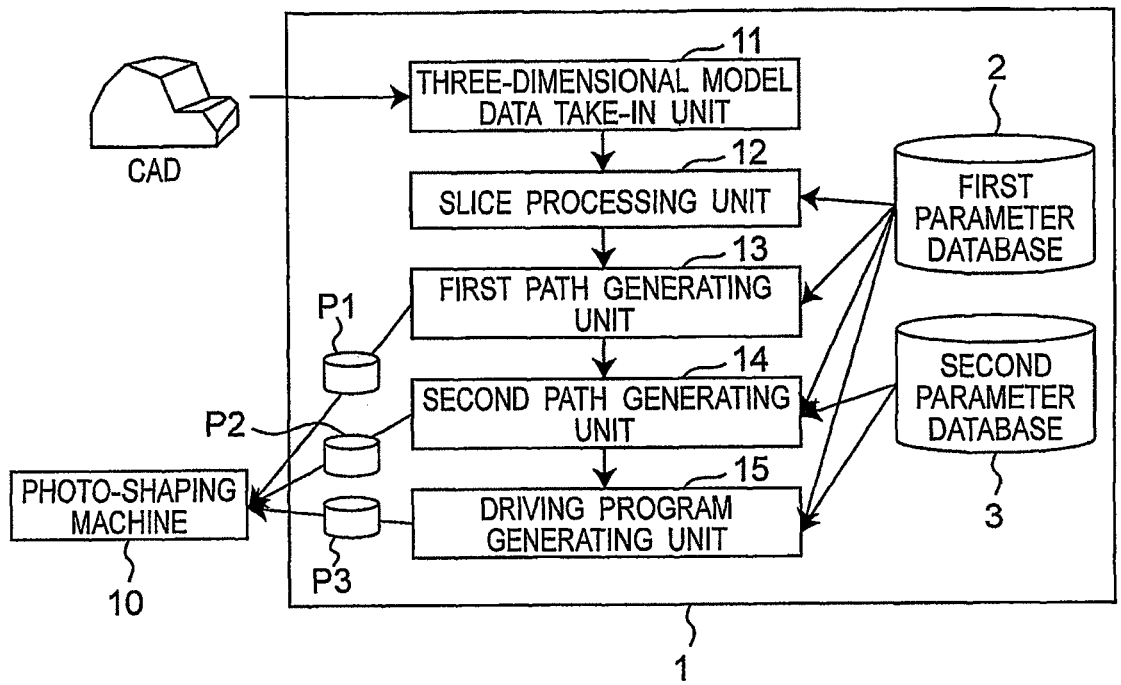
FIGS. 1A, 1B are block diagrams showing an embodiment of a photo-shaping system according to the invention.

A constitution of the computing device 1 for executing computing processes is described below with reference to FIGS. 1A and 1B. As shown in FIG. 1A, the computing device 1 includes a first parameter database 2 containing various parameters for performing photo-shaping, and a second parameter database 3 containing various parameters for removal or cutting process. The computing device 1 further includes a model data take-in unit 11, a slice processing unit 12, a first path generating unit 13 for generating a first path P1 for photo-shaping process, a second path generating unit 14 for generating a second path P2 for removal or cutting process, and further includes a driving program generating unit 15. In this constitution, it is noted here that the first and second parameter databases (2, 3) may be formed as a single database.

Figure 1B:
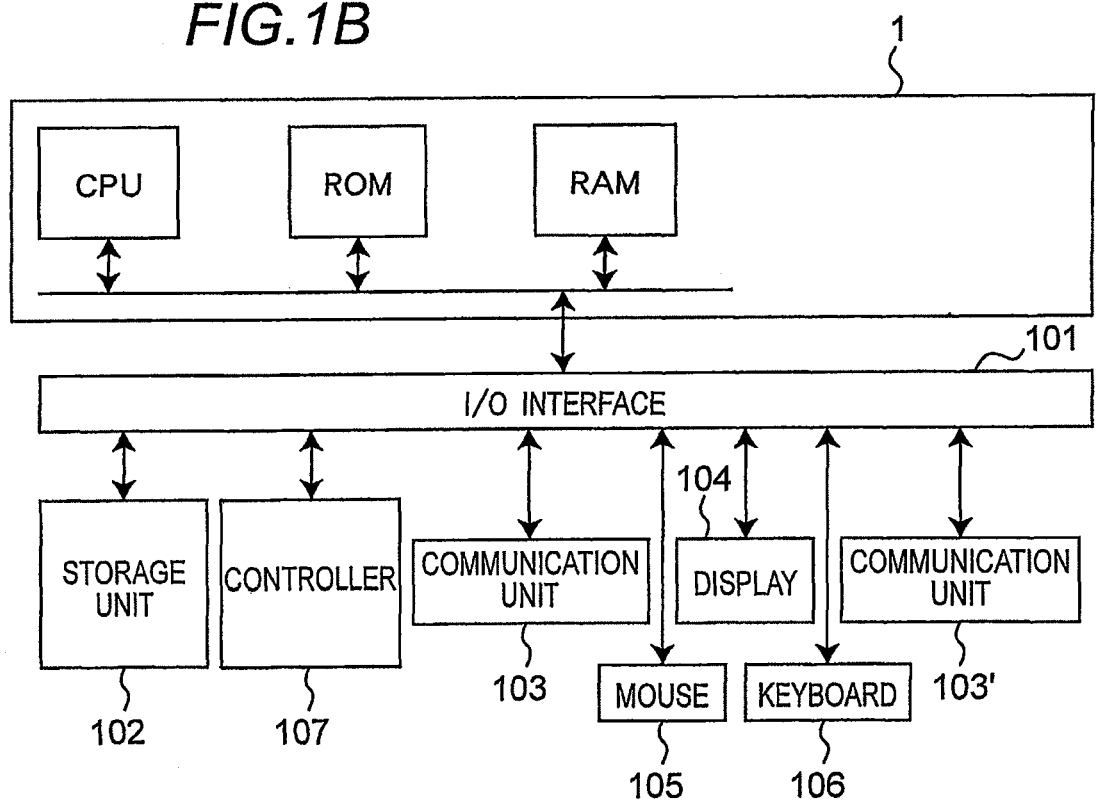

As shown in FIG. 1B, the computing device 1 including CPU, RAM and ROM is connected, by way of an I/O interface 101, to a storage unit 102, communication units 103 (103'), a mouse 105, a keyboard 106, a display unit 104, and a controller 107.

The processing operation of the photo-shaping system according to the present invention will be described below with reference to FIGS. 1A and 1B.

When specified instructions are supplied by manipulating the keyboard and/or the mouse, the CPU reads out a program stored in the ROM or recorded in the storage unit 102 according to the instructions, and loads the program to the RAM to be executed. Alternatively, execution of a program may be also instructed by information received from the communication unit 103 (103'). Then, the CPU issues the processing result as required and the processing result is displayed on the display unit 104 composed of such as LCD or CRT, or transmitted to a printer (not shown) or transmitted to an outside equipment through the communication unit, or stored in the storage unit 102.

The steps of describing programs for the computing device (computer) 1 to execute various processes are not always required to be processed in time series, and they may be processed in parallel or individually. The computing device 1 is not limited to a single unit, but also plural computing devices may be used to discretely process the programs. Moreover, the computing device may be located at a remote position and programs may be transferred to such a remote computing device to be executed.

The storage unit 102 is not limited to a particularly specified type, and as far as the programs and data to be executed by the CPU can be stored, any type of recording medium or memory device may be used as the storage unit 102, for example, magnetic disks such as internal hard disk and removable disk, magneto-optical disk, optical disk, nonvolatile memory, EPROM, EEPROM, other semiconductor memory device such as flush memory device, and any other recording medium that can be read by a computer.

A computer-readable recording medium recorded with photo-shaping programs of the present invention can develop specific effects of the invention when used along with the computing device 1 capable of reading out the photo-shaping programs from the recording medium to be executed.

As shown in FIG. 1A, when a photo-shaping program of the invention is processed and executed by the computing device 1, the model data take-in unit 11 fetches three-dimensional model data from the three-dimensional CAD of a target object to be produced. The slice processing unit 12 slices the model data at a specified pitch to obtain contour data of each section. The first path generating unit 13 generates a first path P1 for routing the light beam irradiation on the basis of the contour data of each section and parameter data stored in the first parameter database 2. The second path generating unit 14 generates a second path P2 for routing the removal process (i.e., milling or cutting process) on the basis of the three-dimensional CAD model data, parameter data stored in the second parameter database 3, and removing timing data showing a removal processing timing. The driving program generating unit 15 generates a driving program P3 for driving the photo-shaping machine 10 and removal processing means 8 provided in the photo-shaping machine, on the basis of the above obtained data of the first path P1, second path P2, and the removing timing data. This means that the model data take-in unit 11 and the various processing units 12 to 15 can be implemented by computer programs (i.e., application software) for executing the operation in the computing device 1.

The first parameter database 2 stores various data of the photo-shaping machine per se as shown in Table of FIG. 2A and various parameters relating to a shaping process as shown in Table of FIG. 2B. The latter data table shown in FIG. 2B includes various data such as light beam irradiation spot diameter, light beam irradiation power, irradiation speed, irradiation pattern (solid painting pattern in section), and irradiation interval, regarding each powder material to be sintered. FIG. 2B shows an example of the latter data table, in which data is described in each sinter powder material and each slice pitch to be mentioned later.

Figure 3A:
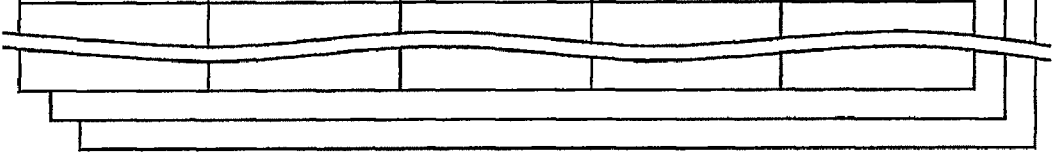
FIGS. 3A, 3B are explanatory diagrams of parameter data contained in a second parameter database.
Figure 3B:
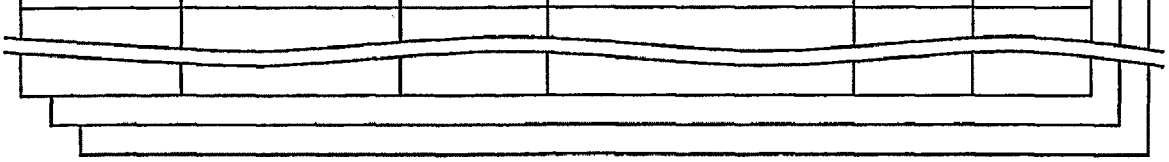

The second parameter database 3 stores various data (parameters) relating to the removal processing means 8 for performing milling or cutting process provided in the photo-shaping machine. As shown in FIG. 3A, the database 3 includes a tool master data portion storing data of tool diameters and underhead length of tools (end mills) usable in each work material and tool material, holder diameter, data of types such as a ball type or flat type, or other specification. As shown in FIG. 3B, a cutting condition data portion stores collecting tools usable in each finishing mode, and drive conditions thereof.

Next, the computing operation performed by the computing device 1 is explained below. First, the model data take-in unit 11 fetches three-dimensional model data of a target object desired to be produced from the three-dimensional CAD as a three-dimensional solid model or surface model (for example, STL model) describing at least face and back attributes of surfaces.

Expression format of the model data may be specified any of curvature expression such as NURBS, and polygonal approximate expression by triangle or the like. The curvature expression is preferred where curvature precision is demanded in the desired model, and the polygonal approximate expression is preferred where the processing time is more important.

Figure 4A:
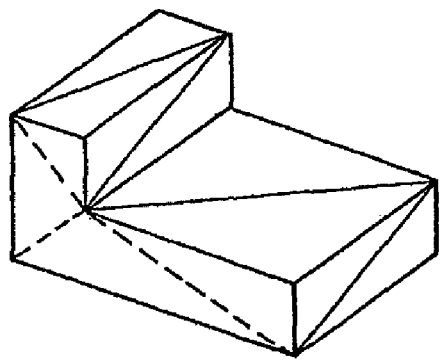
Figure 4B:
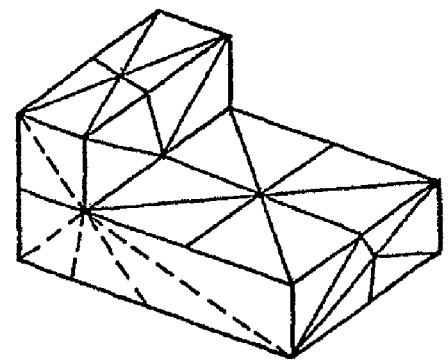

In sintering process by laser scanning, strict precision is not demanded, and model data of rough polygonal approximate precision as shown in FIG. 4A may be used. In removing process by milling or cutting, since a model of high precision is demanded, the precise polygonal approximate model (for example, STL expression) data or curvature display model data as shown in FIG. 4B may be applied. That is, types of the model data may be different between the case when generating the first path P1 for shaping process and the case when generating the second path P2 for removal process. However, it is noted here that, in both of the model data, systems of coordinates defining the positions thereof should be matched.

Figure 5:
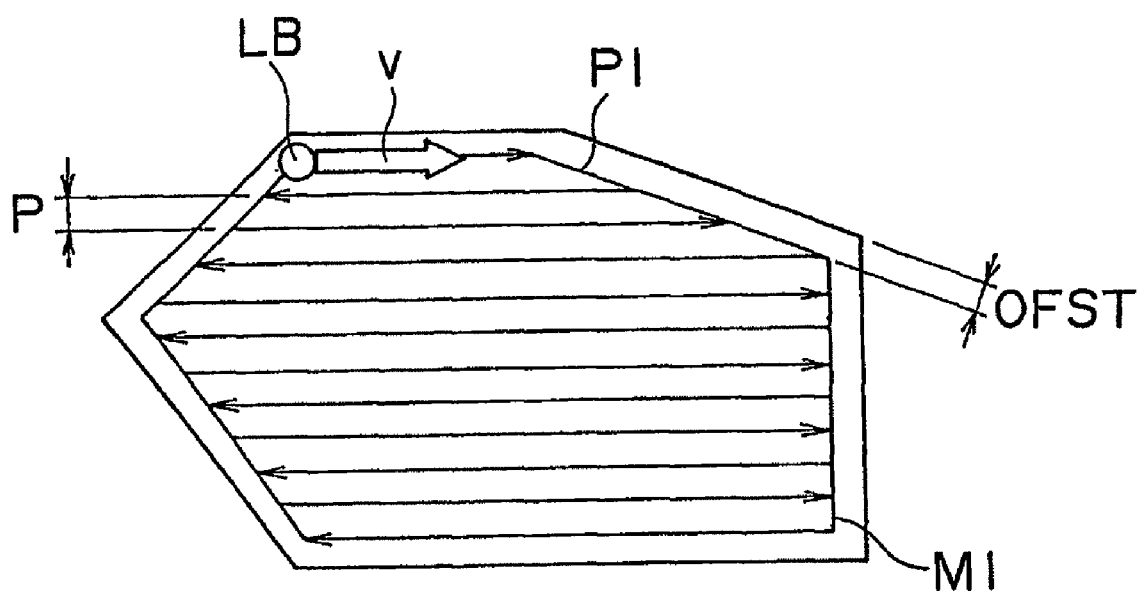
FIG. 5 is an explanatory diagram of a first path.

Next, the slice processing unit 12 slices the model data at a specified pitch, so that contour data of each section is obtained. This slicing process may be realized by a known art, for example, disclosed in Japanese Patent Application Laid-Open Publication No. 2001-277369, and not specifically described here for brevity. In this slicing process, as shown in FIG. 5, an offset amount OFST in offset process described in this publication is not limited to a value of a light beam spot diameter, but may be preset to a specified amount. This specified amount is preferably referenced on the value preliminarily described in, e.g., the first parameter database 2, or may be also a value entered by an operator during the process. The offset process direction is not limited to the inner side of the contour line, but the offset may be shifted to the outer side from the contour line so that a large allowance for removal may be provided in the removing process.

The slice pitch may be either entered by the operator, or determined automatically depending on the powder material, model shape, or required precision.

When a shape of each section is obtained in the slicing process, the first path generating unit 13 refers to the parameter data stored in the first parameter database 2, and generates a first path P1 in each section shape for routing the light beam irradiation on the basis of the contour data of each section. At this first path generating step, as shown in FIG. 5, positional coordinates when scanning on the contour of the sliced section M1 of a model by a light beam LB are described sequentially, and solid painting path coordinates inside the sliced section are described sequentially. Thus, the first path P1 is generated in a format usable as NC data for a NC controlled photo-shaping machine. It is preferred that the spot diameter of the light beam LB, irradiation speed v, irradiation interval p, irradiation power and other irradiation conditions should be described in the data of first path P1. Thus, it is not necessary to set these conditions separately when starting the process, and operation errors can be curtailed.

Subsequent to or in parallel to the first path generating step for shaping, the second path generating unit 14 generates a second path P2 in a format usable as NC data for NC controlled removal processing means, on the basis of the model data and removing timing data given separately. Regarding the tools to be used, the operator may select from the tools stored in the second parameter database 3, or the second path generating unit 14 may automatically determine the tool to be used by referring to the model shape as mentioned below.

When the tool to be used is determined, the processing method and a region to be processed are determined. The processing method may include conventional cutting process such as contour line processing, surface copy processing, corner skip processing, and others, although not limited thereto.

When the tool, processing method, and processing region are determined, the second path P2 is generated for removal process. This process may be realized by an offset method, reverse offset method, and Z_Map method employed in the conventional CAM for cutting process, and others, although not limited thereto.

However, the second path P2 should be divided in the height direction depending on the value of the removing timing data by referring thereto. For example, in the case where the removing timing data is specified such that the removing process is executed every time the sintered layers are stacked up by 5 mm in thickness, the path should be divided at every 5 mm in height direction. The removing timing data may be either specified by the operator, or may be based on a value preset in the second parameter database 3. Also, the second path generating unit 14 may be constructed to generate the removing timing data on the basis of the model data and second parameter data stored in the second parameter database 3. Also, as mentioned below, the removing timing data may be selected automatically depending on the tool to be used. In this case, the division method is described later.

When the first path P1 is generated by the first path generating unit 13 and the second path P2 is generated by the second path generating unit 14, the driving program generating unit 15 generates a driving program P3 for supervising the first path P1, second path P2, and removing timing data.

The program P3 is used for driving both the photo-shaping machine 10 and the removal processing means 8 along with the first and second paths P1 and P2 as sub-programs. That is, the first path P1 is used as NC data for photo-shaping machine and the second path P2 is used as NC data for removal processing means. The driving program P3, first path P1 and second path P2 are transferred to the controller 107 for controlling the operations of the photo-shaping machine and its removal processing means. When the operator instructs execution of the driving program P3 stored in the controller, the program P3 fetches the necessary first path P1 and second path P2 sequentially, so that the photo-shaping machine and its removal processing means are driven. As a result, the photo-shaping machine and its removal processing means execute a photo-shaping process by irradiating a light beam according to the first path P1, thereby forming the sintered layers to be laminated, and then the removal processing means is operated according to the second path P2 for executing removal process every timing specified by the removing timing data. Thus, a target object of a photo-shaping product is manufactured by repeating the above processes.

Figure 6A:
FIGS. 6A, 6B are explanatory diagrams of other example of parameter data contained in the second parameter database.
Figure 6B:
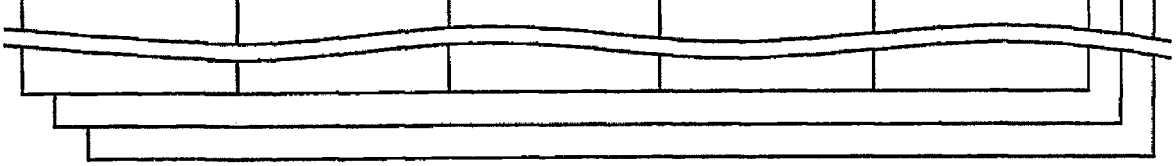

In order to select the tool automatically for use in the removing process, for example, data for selecting a proper tool depending on the undulation, curvature rate, horizontality or verticality of the surface of the object to be cut off is recorded in the second parameter database 3 as shown in Table of FIG. 6A, or data of priority of tools where plural tools can be used is recorded as shown in Table of FIG. 6B.

Figure 7:
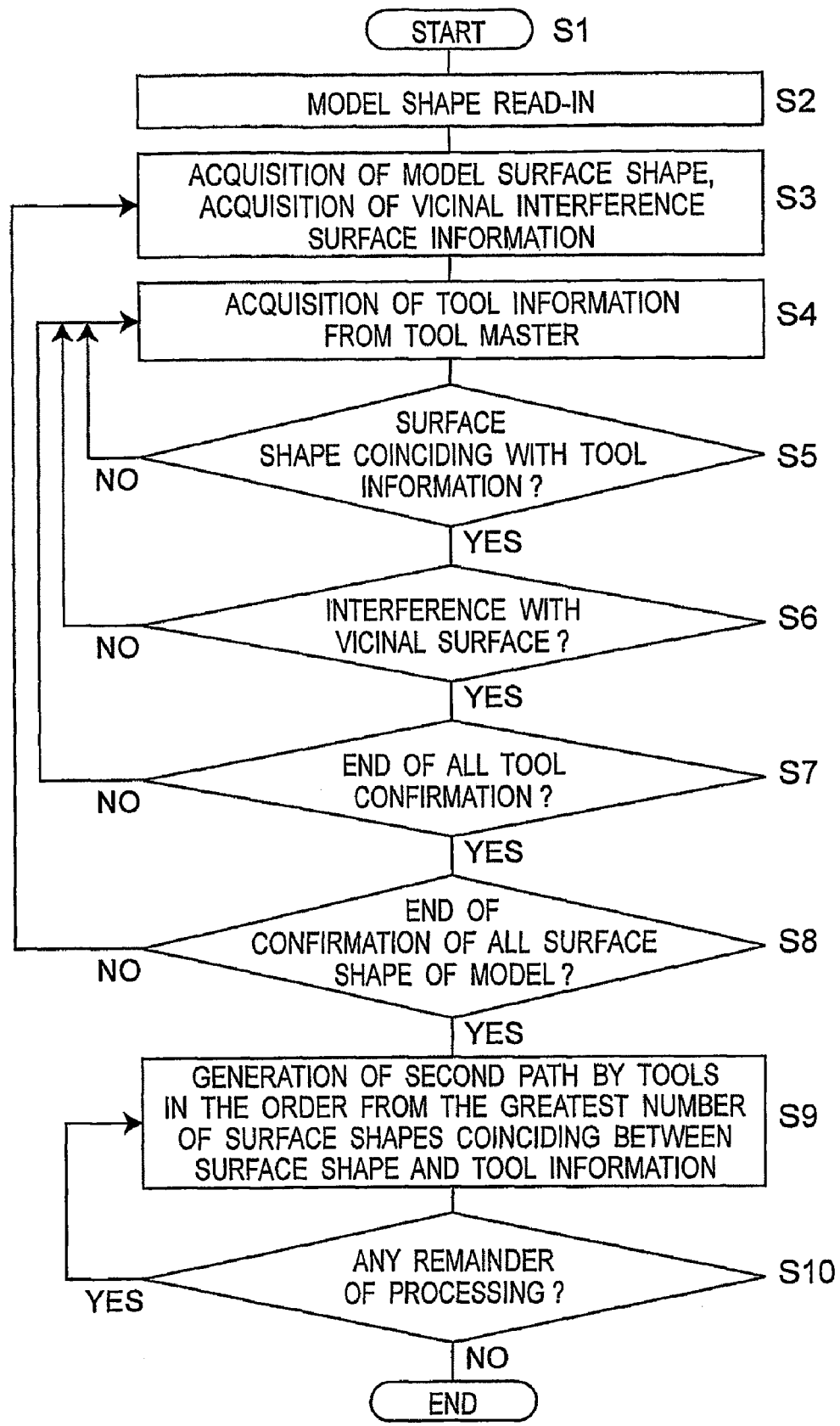
FIG. 7 is a flowchart showing an interference check.

Thus, as shown in FIG. 7, when the second path generating unit 14 generates the second path P2, information of a surface shape and information of a vicinal interference surface area are acquired from the model data (Step S3), and the tool is selected based on the data depending on the surface shape (Steps S4, S5), and interference with vicinal surface is checked (Step S6), and if interference is detected, a tool of lower priority (usually a tool of smaller diameter) is selected.

Automatic selection of a removing tool is a conventional technique and not new, but in order to execute the removing process in the lamination process of stacking up the sintered layers in the present embodiment, the selection algorithm in the present embodiment is different from the conventional algorithm in the following points. That is, at the time of executing the removing process in the present invention, there exists no more laminated sintered layer at a position higher than the height of the sintered layers presently stacked up to be subject to the removal process. Therefore, a step of "checking for interference of a tool, tool holder or spindle with a formed body to be subject to removal" can be skipped. Whereas, in the conventional method, such a checking step was essential when a finished product is subject to removal process. Accordingly, the tool selection processing time can be remarkably shortened in the present invention.

Figure 8:
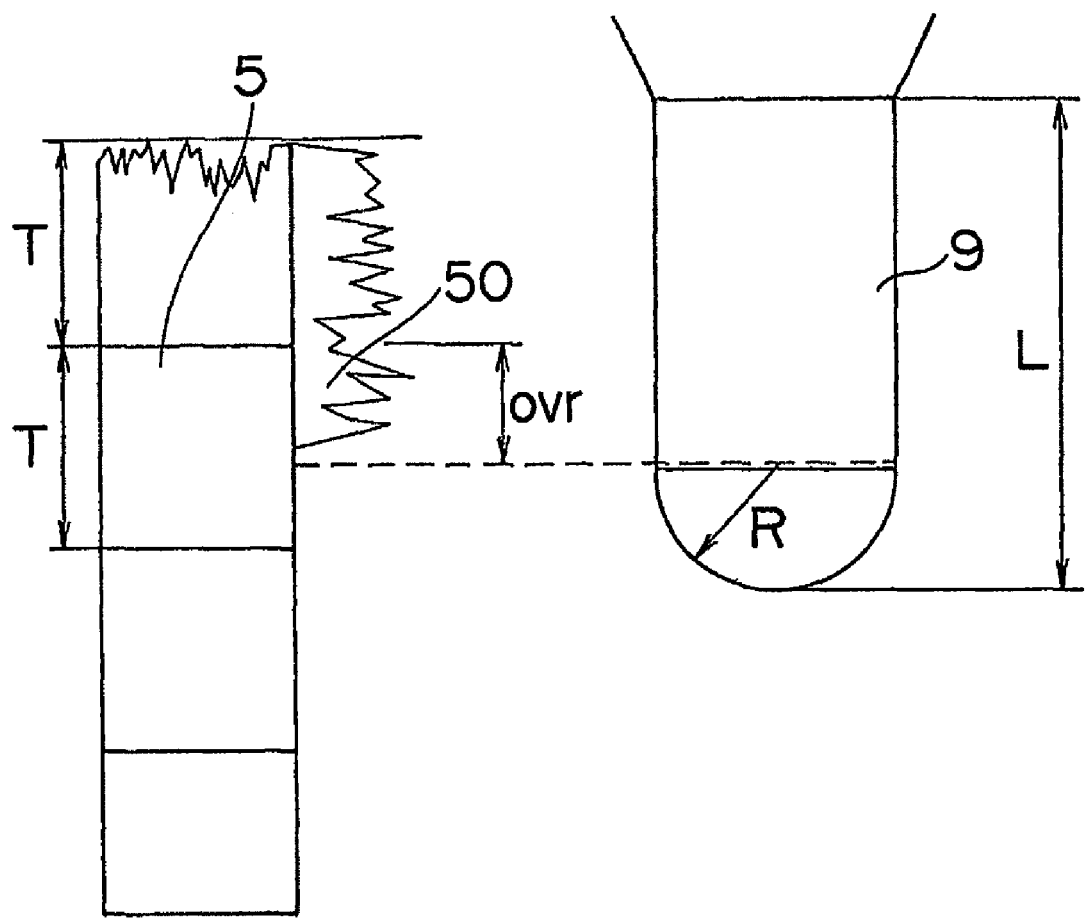
FIG. 8 is a side view showing an excess hardened portion and a tool.

Besides, as mentioned above, when the second path generating unit 14 generates the removing timing data on the basis of the model data and second parameter data in the second parameter database 3, the removing timing data (depth of cut) T may be determined on the basis of underhead length L and end diameter R of a tool 9 as shown in FIG. 8. However, actually the following points should be preferably taken into consideration. That is, at the time of performing photo-shaping process, as shown in FIG. 8, a drooping excess of a sintered portion 50 is formed at the side of the presently laminated and sintered portion 5, and an overlap amount "ovr" necessary for removing the drooping portion of the excess sintered portion 50 must be included in the second parameter database 3, in addition to the underhead length L and end diameter R of the tool 9, and the value subtracting the overlap amount "ovr" and the end diameter R from the underhead length L of the tool 9. Alternatively, a smaller value than that is set as the removing timing data T. When using a plurality of tools 9 in one removing step conducted during the laminating and sintering steps, the removing timing data T is determined by conforming to the tool 9 of shortest underhead length L. When using a plurality of tools 9, by applying the cutting timing data of each tool 9, the removing process can be executed by the tool 9 when reaching this timing.

In the process of generating the second path P2, the division process executed depending on the removing timing data T is explained below. In this division, in one case, the second path P2 is firstly calculated on the entire model data, and subsequently the second path P2 for the entire model data is divided according to the removing timing data T. Alternatively, in another case, the model data may be first divided in the height direction depending on the removing timing data T, and then individual second paths P2 may be generated on the basis of the respective divided model data.

Figure 9:
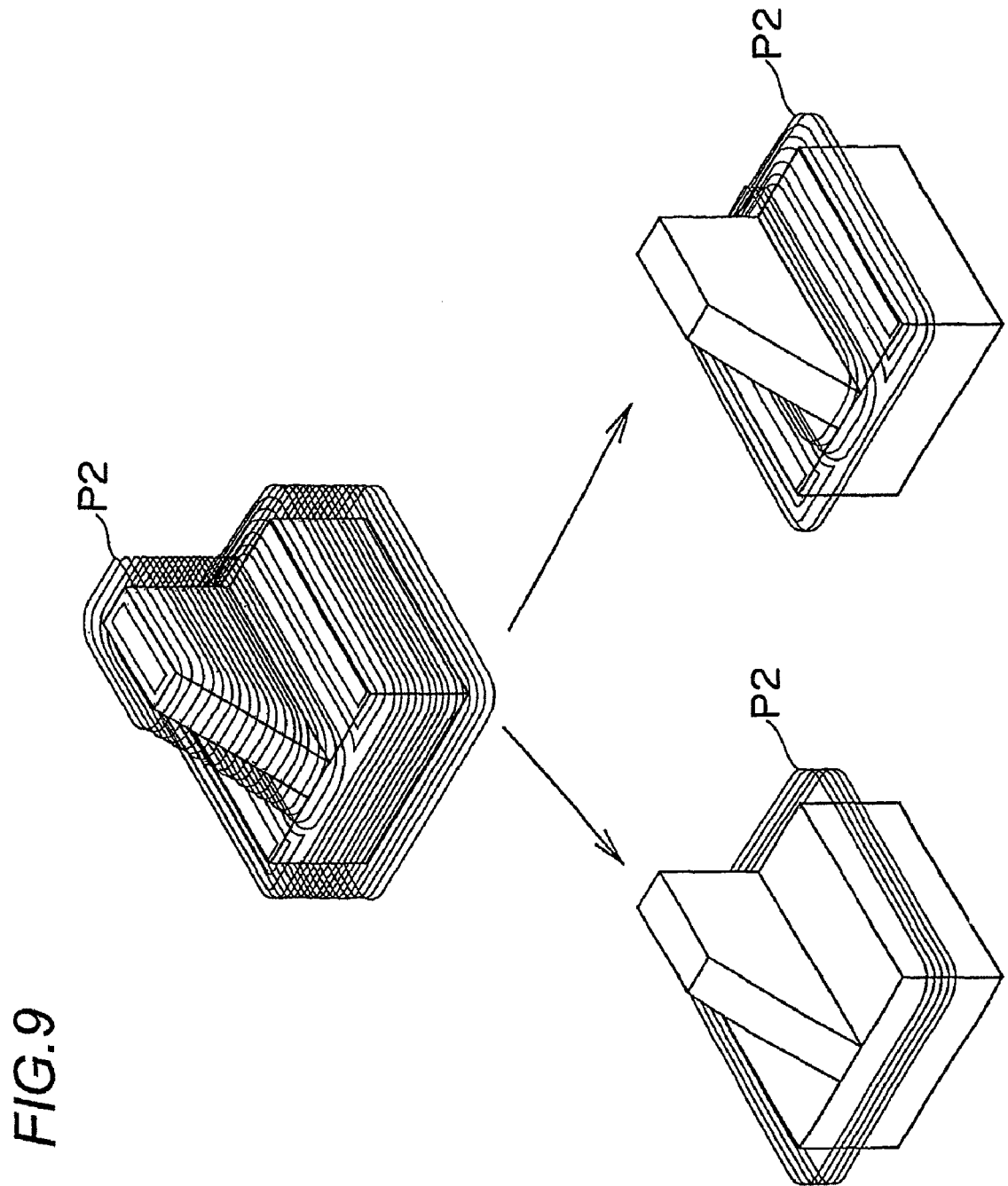
FIG. 9 is an explanatory diagram of division of a second path.

In the former case, as shown in FIG. 9, the second path P2 of the entire model is first generated, and portions corresponding to each removing height range divided by the removing timing data T are sequentially extracted from the entire second path P2, so that the divided second paths P2 are obtained. In this case, the second path P2 of the entire model can be confirmed, and missing processing step or path can be confirmed. When calculating the second path P2, although a model shape recognition process is needed and this process consumes time, the shape recognition process is needed only once, and the overall computation time can be shortened.

As mentioned above, in the removing process, it is preferred to overlap to the lower side, and when extracting the portion corresponding to the removing height range from the second path P2 of the entire model, the second path P2 is extracted after overlapping and setting each removing height range divided by the removing timing data T.

Figure 10A:
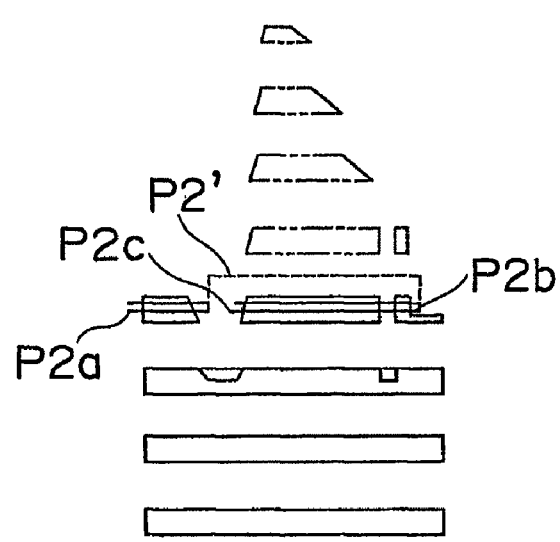
FIGS. 10A, 10B are explanatory diagrams showing an aerial route path, where 10A being a side view and 10B being a plan view.
Figure 10B:
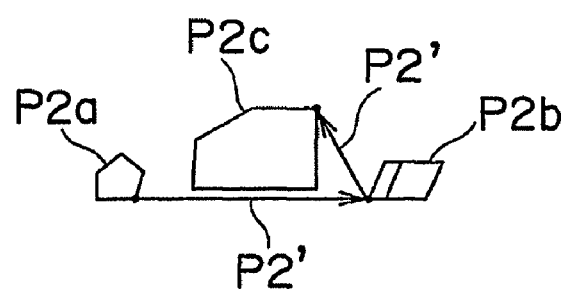

When calculating the second path P2, if there are portions (islands) to be removed at different positions within a certain removing height range as shown in FIG. 10, a plurality of removal second paths P2a, P2b, P2c are generated for the portions (islands), and simultaneously or after the generation, an aerial route path P2' is generated for linking these plural second paths P2a, P2b, so that one second path P2 is created.

Figure 11:
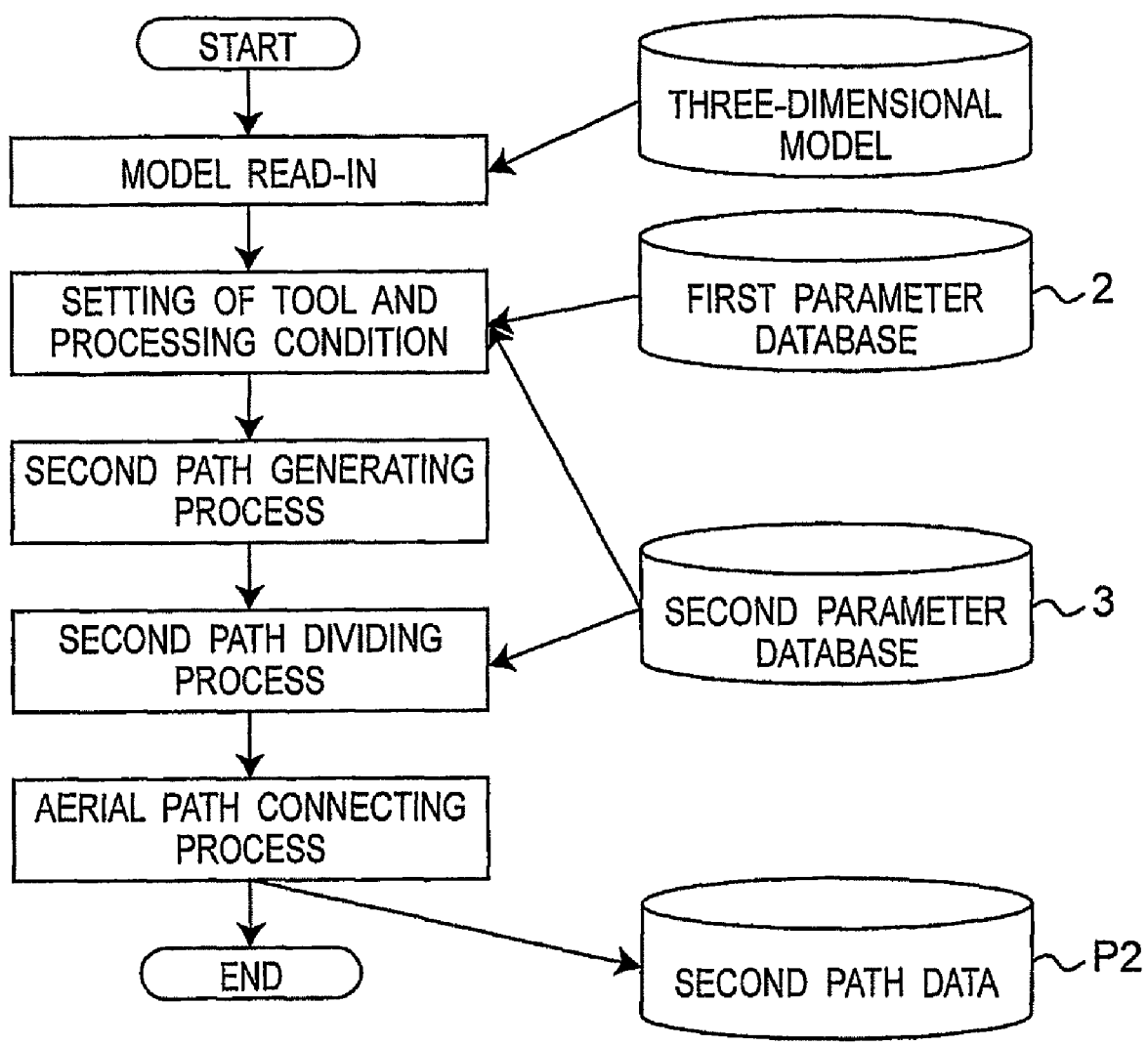
FIG. 11 is a flowchart showing a second path generating process accompanied by dividing process.

The aerial route path P2' can be calculated easily because, same as in the case of the automatic selection of the tool for removing process mentioned above, nothing is formed above the object portion of the second paths P2a, P2b, P2c to be connected at the moment of removing. Therefore, there is no interfering object above this portion, and it is not practically necessary to calculate the aerial route path P2' in consideration of interference. Accordingly, in spite of calculation of the second path P2 from the entire model, the aerial route path P2' is generated by shifting slightly above the second paths P2a, P2b, P2c so that the tool end may pass slightly above, for example, 0.1 mm to 1 mm higher than the upper side of the object portion of the second paths P2a, P2b, P2c to be connected. In this process, it is possible to ignore the model shape indicated by chain line in FIG. 10A above the portion presently calculating the second path P2. Since almost no consideration is needed for interference, the second paths P2a, P2b, P2c to be connected may be merely linked by a convenient path, for example, aerial route path P2' linking by shortest distance. FIG. 11 is a flowchart showing the operation of generating the above second path P2 including the aerial route path P2'.

Figure 12:
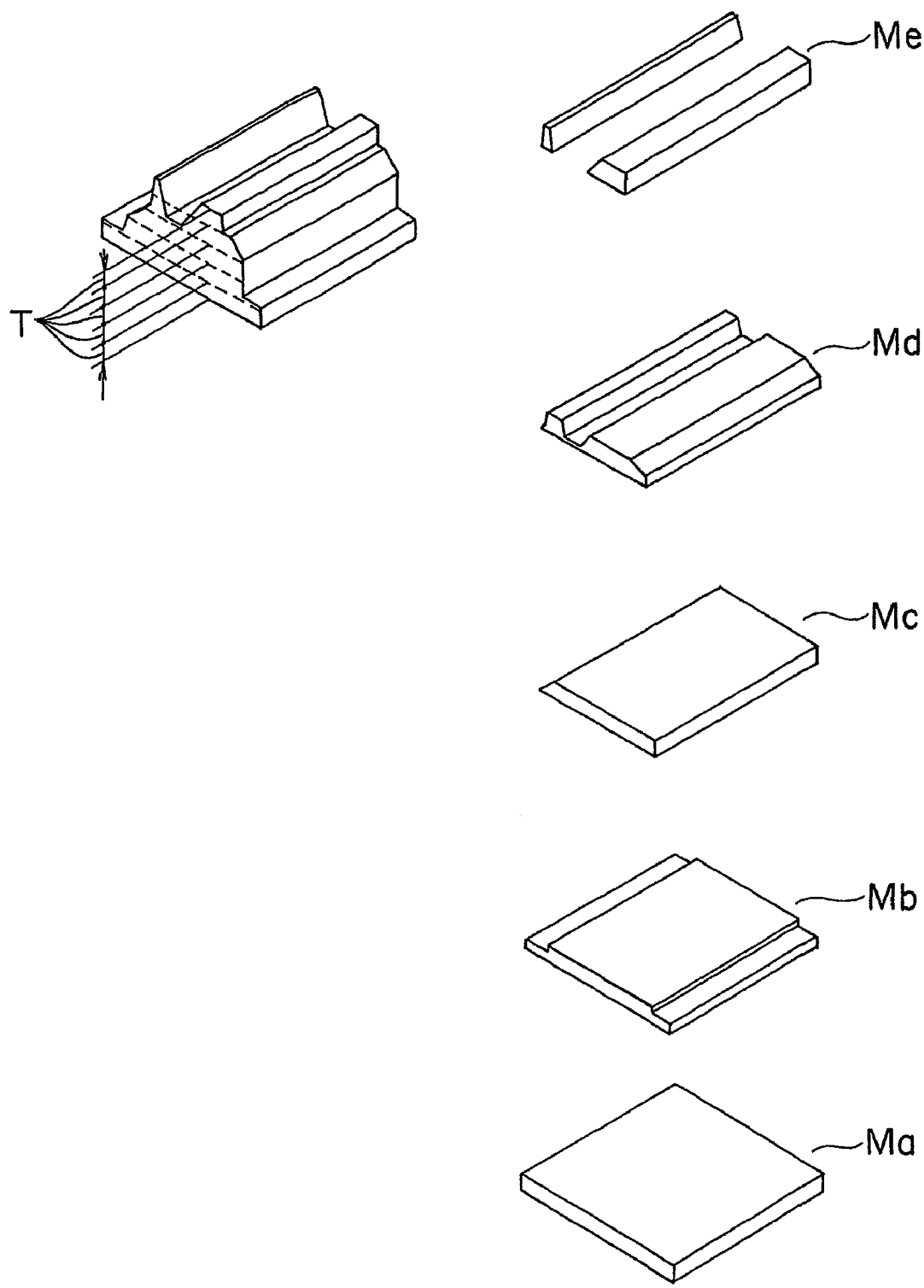
FIG. 12 is an explanatory diagram of model division.
Figure 13:
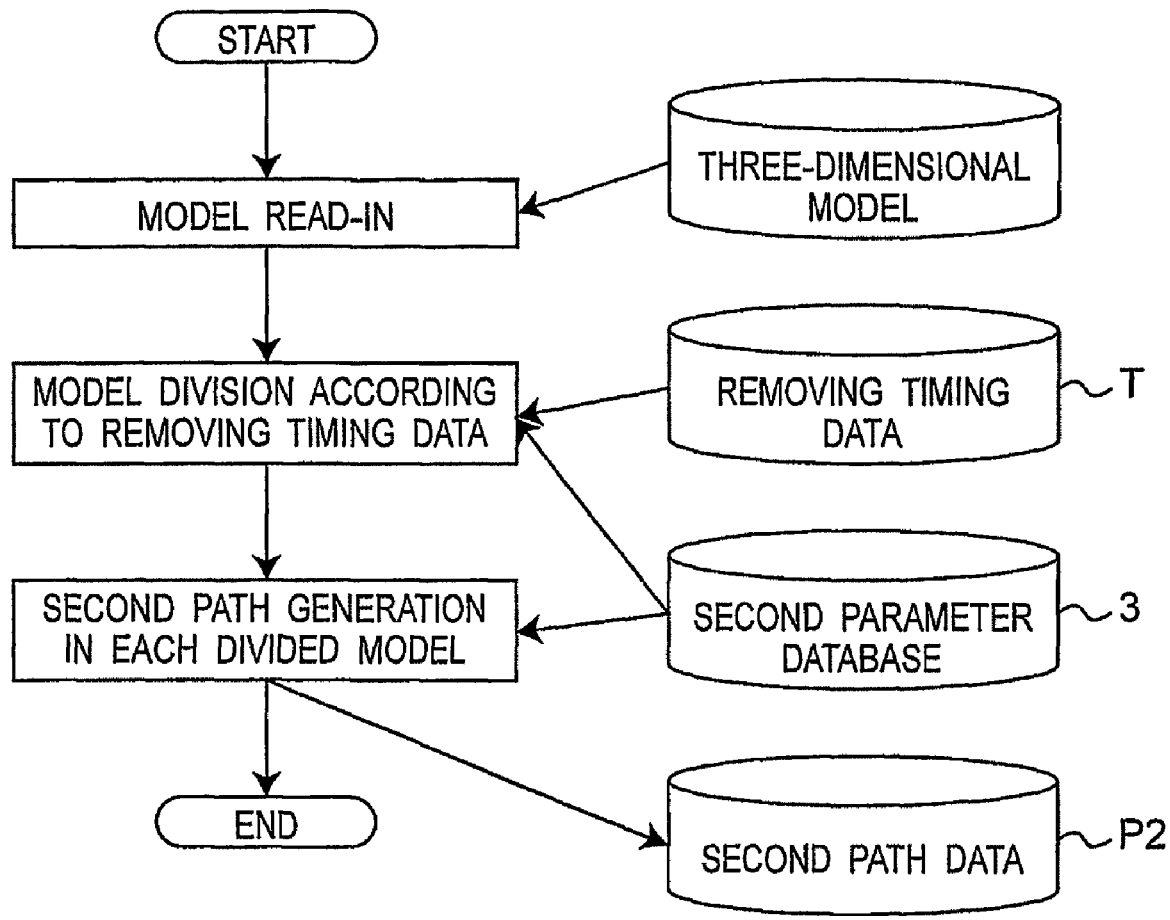
FIG. 13 is a flowchart showing another example of the second path generating process accompanied by dividing process.

When the model data is divided according to the removing timing data T as shown in FIG. 12 so that the second paths P2 are generated individually for divided model data, it is not necessary to obtain the second path P2 for the uppermost surface of the divided model data, and the calculation thereof is excluded from the calculation range of the second path P2. FIG. 13 shows the flowchart in this case. As required, an aerial route path P2 can be generated as mentioned above.

Since the second paths P2 are calculated individually for plural pieces of model data, it is preferable that a plurality of second path generating programs are started so that the divided plural model data are transferred to the second path generating programs to be processed in parallel, and thus the computation time can be shortened.

Moreover, it is another merit that an economical second path P2 can be obtained by using an appropriate tool depending on the divided model shapes. For example, in FIG. 12, a model of shape (Ma) has a removing surface only on a vertical plane of a side, and a flat end mill of large diameter is selected as a tool, and processing by a great depth of cut is realized, and as for models of shape (Mb), (Mc), (Md) and (Me) in FIG. 12, having curvature and slope, ball end mills may be selected as a tool to finish the surface smoothly. Further in models of shape (Mc) and (Me) in FIG. 12, since there is no stepped portion, ball end mills of large diameter as a tool can be used to process promptly. In models of shape (Mb) and (Md) in FIG. 12, since there are stepped portions, and ball end mills of small diameter as a tool are selected to process the stepped portions efficiently.

When a model of shape (Me) is divided into plural islands as shown in FIG. 12, in order to recognize easily, it is easy to generate a second path P2a accompanied by change in depth of cut for a certain island, a second path P2b accompanied by change in depth of cut for other island, and one aerial route path P2' for linking these second paths P2a, P2b. In this case, the paths can be generated easily and in a shorter time, as compared with the case of generating multiple aerial route paths, by linking a second path of height portion for a certain island, and a second path of height portion for other island, by an aerial route path, changing the depth of cut, and further repeating the same steps.

Figure 14A:
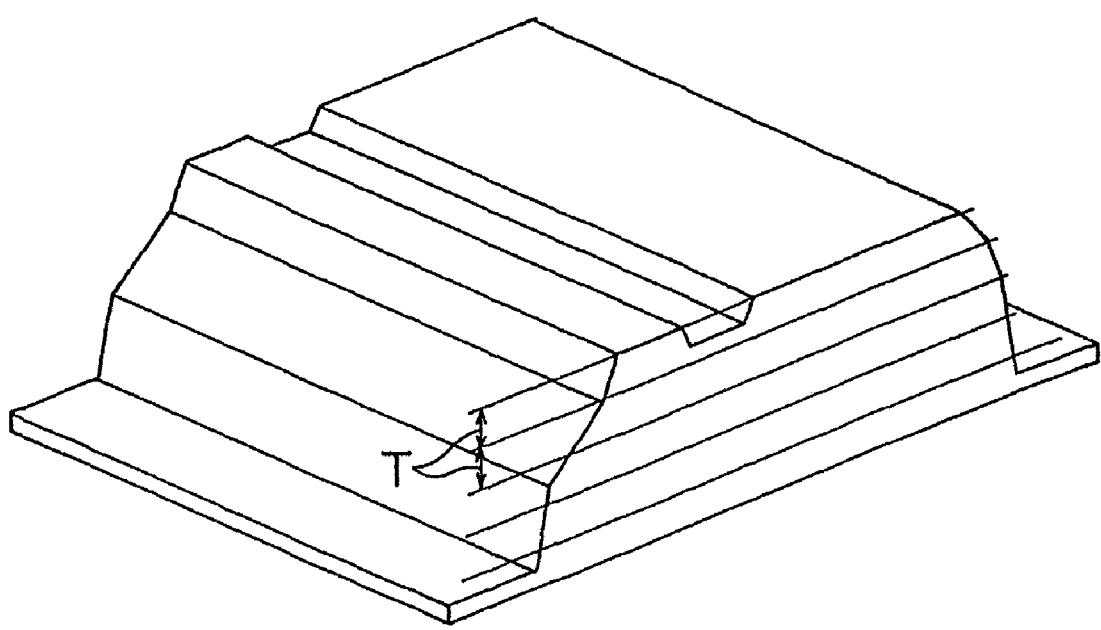
FIG. 14A is a perspective view of an example of model, and 14B is an explanatory diagram of divided model with overlap.
Figure 14B:
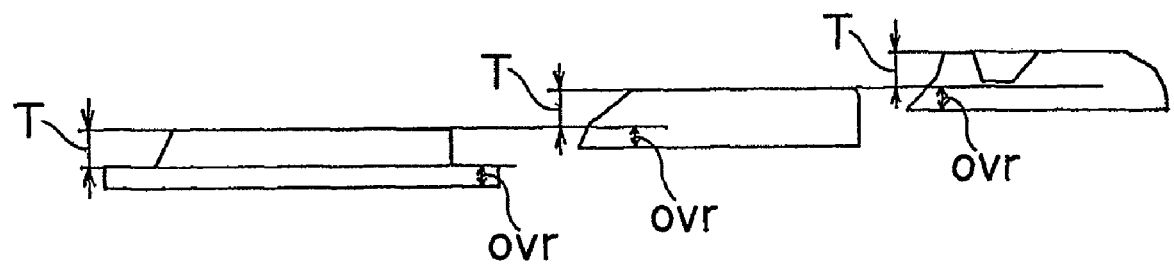

As mentioned above, in the process of generating the second path P2, since it is preferred to overlap the removing process to the lower side, when dividing the model, as shown in FIG. 14, individual second paths P2 are calculated from the divided models extended to the lower side by a portion of overlap amount "ovr" stored in the second parameter database 3, from the amount indicated by the removing timing data T.

Figure 15A:
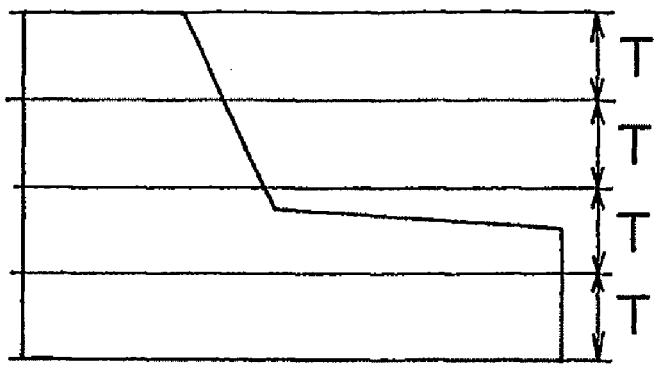
FIG. 15A is a side view of an example of model, 15B is a side view of manufacturing intermediate state of the same model, and 15C is a side view of a model of an excess hardened portion.
Figure 15B:
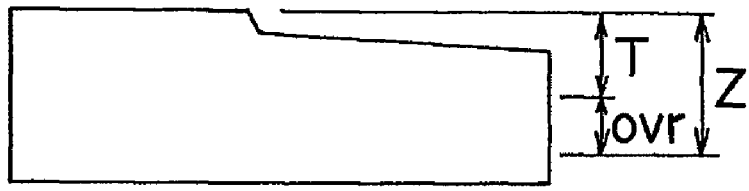
Figure 15C:
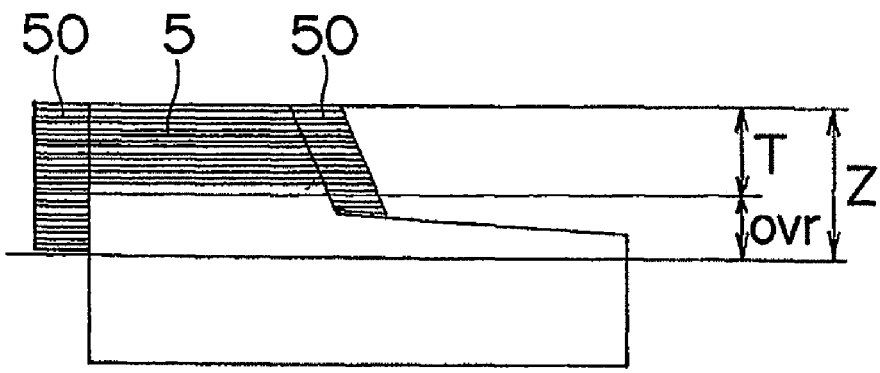

Further, when generating the removing pass P2 based on the divided models, it is easy to solve the following problems in the case of generating the second path P2 overlapped to the lower side. That is, as shown in FIG. 15A, in the case of a model in a shape having a moderate slope portion, the portion shown in FIG. 15B is subject to removal, and a sintered layer is laminated thereon. Thereafter, when removing next time, in the above calculation of the second path P2, since the entire region of moderate slope portion is in the range of the overlap amount "ovr", the second path P2 is set in this entire region. Indeed, however, the drooping excess hardened portion 50 only overlaps with a part of the moderate slope portion as shown in FIG. 15C, and the other portion is the portion being cut off by the preceding removing process, and excess hardened portion 50 does not exist. Hence, this portion does not require another removing process, and if the second path P2 is generated from the divided model extended to the lower side merely by the overlap amount "ovr", the second path P2 is generated while consuming wasteful time.

However, this problem can be solved by creating an excess hardened portion additional model added with a model of preliminarily predicted excess hardened portion 50, and generating a second path P2 intended to remove this excess hardened portion additional model.

Figure 16:
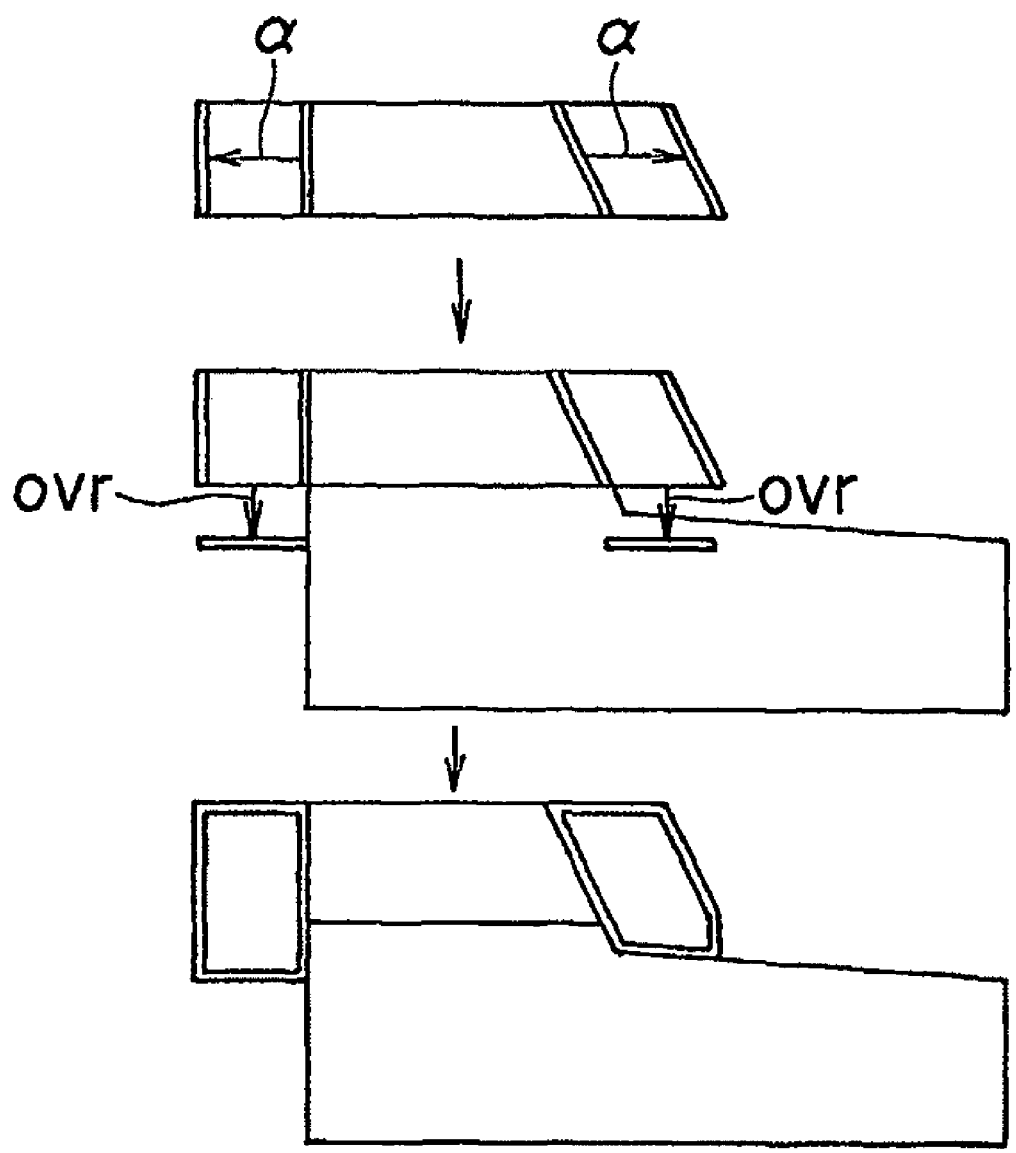
FIG. 16 is an explanatory diagram showing making procedure of a model of an excess hardened portion.

The model of excess hardened portion 50 at this time is obtained, as shown in FIG. 16. Specifically, by adding offset amount α to the surface to be removed in the model sectioned by removing timing data T, extending the lower side of the offset portion downward by the portion of overlap amount "ovr" or the drooping amount of excess hardened portion 50 given separately as parameter data, and excluding the portion overlapping with the initial model (this model is the model segmented by the removing timing data T combined with the model of the lower layer side) from the region enclosed by them.

Figure 17:
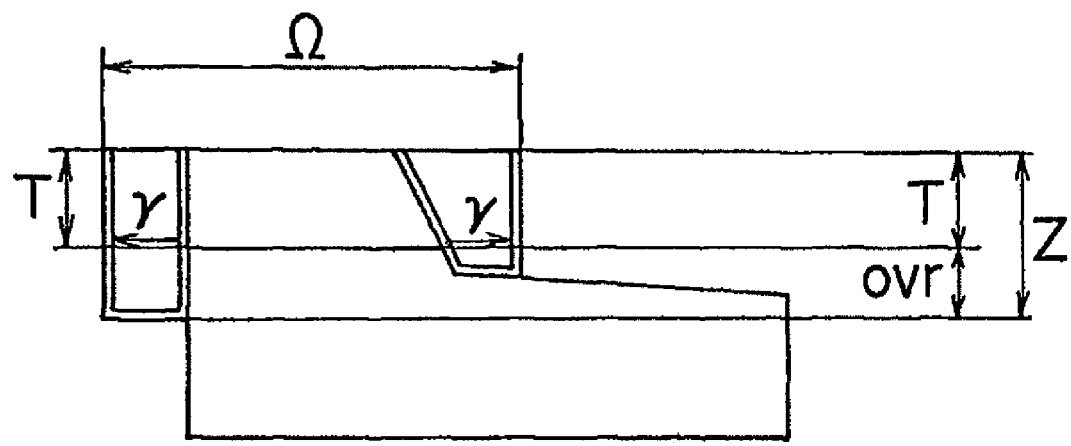
FIG. 17 is an explanatory diagram showing another example of determination of generating a range of a second path.

As shown in FIG. 17, by adding an offset amount Y to the outer side from the contour of the lowest part of the model divided by the removing timing data T, and inside of the contour adding this offset amount Y and only the range not overlapping with the initial model is set as a movable range Ω of a tool, and the second path P2 is generated only in the region conforming to both a removing range Z determined from the removing timing data T and overlap amount "ovr", and the tool movable range Ω. Thus, the problem of making unnecessary second path P2 can be eliminated.

These offset amounts α, Y and the downward extending amount (for example, overlap amount "ovr") are preliminarily determined depending on the powder material to be used and its sintering condition, and these amount are stored in the second parameter database 3.

Further, when determining the second path P2 on the basis of each model divided according to the removing timing data T, when calculating the second path P2, it is preferred to refer to the model shape of a lower layer side further from the calculating range of the second path P2 determined by the removing timing data T and overlap amount "ovr", where the model shape of a lower layer side is referred as an interference checking area with the tool.

Figure 18:
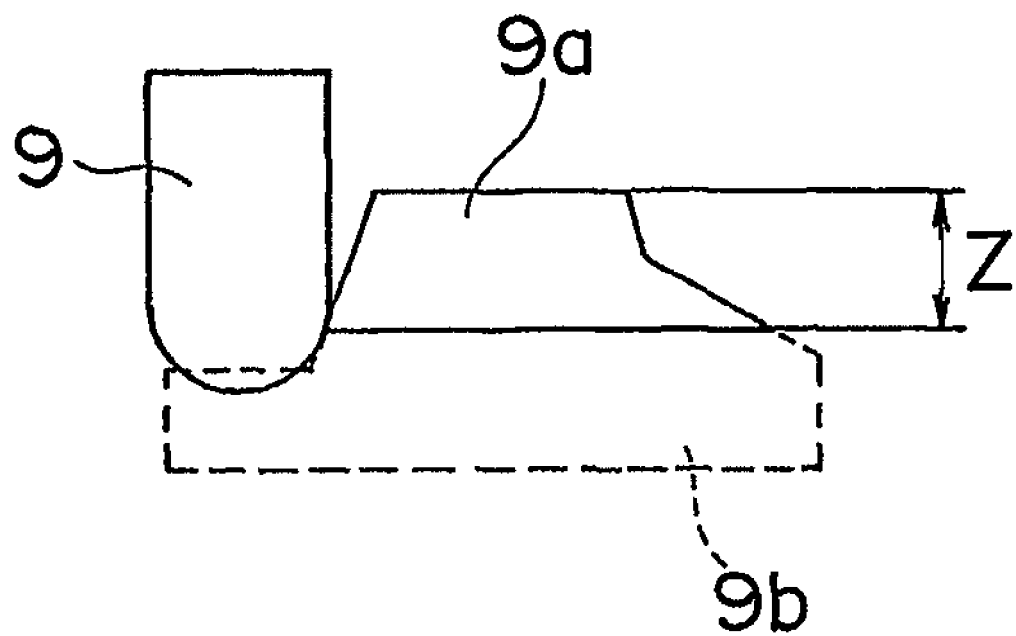
FIG. 18 is an explanatory diagram showing a reference range for interference check.

As shown in FIG. 18, when cutting and removing the partial opening 9a of the removing object range Z by the side edge of the tool 9 as a ball end mill, since the leading end of the tool 9 may interfere with the lower layer side, the lower portion 9b from the removing object range Z is transferred to the second path generating unit 14 as reference region. The range of the model to be referred to may be all model shape lower than the removing object range Z, but it may be the range corresponding to the radius R of the tool 9 in consideration of a speed.

Similar problems exist when determining the second path P2 for the entire model and then dividing the path P2 according to the removing timing data T. However, since the model for the cutting and second path P2 to be generated is the entire model, it is not necessary to add separately as reference range, and interference may be checked directly.

Figure 19A:
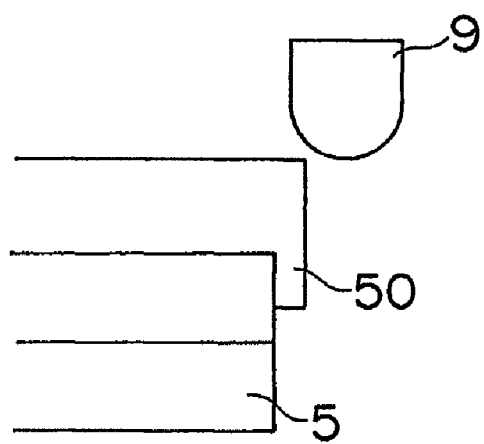
FIG. 19A is a side view showing a problem when using a ball end mill as a tool, and 19B is a magnified side view showing solving means of the problem.
Figure 19B:
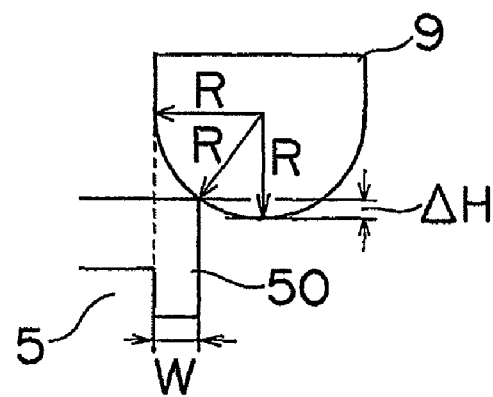

When dividing in either manner, if the tool 9 to be used is a ball end mill, it is preferred to calculate the second path P2 in consideration of the following points. That is, when the second path P2 is generated according to the removing timing data T, if the tool 9 is ball end mill, since the leading end of the tool 9 is hemispherical, a cutting start position comes to a point shown in FIG. 19A, and in an initial path in contour line processing, it may not contact with the excess hardened portion 5 at all, possibly resulting in processing failure.

Accordingly, the contacting height of the tool 9 is determined on the basis of the end radius R of the tool 9 stored in the second parameter database 3 and the predicted data of width w of the excess hardened portion 5, and by starting cutting from this height, processing time loss by failure can be eliminated.

The contacting height of the tool 9 with the excess hardened portion 5 is calculated as a position value by lowering by a distance ΔH from the upper surface of the portion to be removed in the model, where ΔH is obtained by a formula as following:

$(R-\Delta H)^2 + (R-W)^2 = R^2$ $(R-\Delta H)^2 = W(2R-W)$ $\Delta H = R - (W(2R-W))^{1/2}$ Of course, when the tool 9 is a flat end mill, the cutting start position is determined by assuming R=0.

INDUSTRIAL APPLICABILITY

Therefore, the present invention is capable of obtaining the first path and second path from the parameter data stored in the first parameter database containing various parameters for photo-shaping, parameter data stored in the second parameter database containing various parameters for removal process, removing timing data, and model data, and capable of obtaining driving programs for executing these first path and second path sequentially. Thus, operator's labor and time of executing processes of photo-shaping can be substantially saved, and processes of photo-shaping can be executed efficiently by executing the removal process during repetitive steps of laminating sintered layers.

The invention claimed is:

1. A photo-shaping method which includes a process of photo-shaping a target object executed by a photo-shaping machine along with a computing process executed by a processor, the photo-shaping process including irradiating a light beam to a specified position of a powder material layer to sinter a desired part of the powder material layer to form a sintered layer, covering the sintered layer with a new powder material layer, irradiating a light beam to a specified position of the new powder material layer to sinter a desired part of the new powder material layer to form a new sintered layer integral with the underlying sintered layer, repeating the process of forming the sintered layers in lamination, and removing an outer face of a formed body of the sintered layers in lamination during the repetitive forming process of the sintered layers, the computing process executed by the processor comprising:

storing first parameter data in a first parameter database for use in the light irradiation process in the photo-shaping process, the first parameter data including at least light beam irradiation spot diameter, light beam irradiation power and irradiation speed to be applied to a powder material;

storing second parameter data in a second parameter database for use in a removal process, the second parameter data including tool master data relating to the removal process and cutting process conditions of a tool to be used in the removal process;

generating a first path as a light beam irradiation path for the light irradiation process, by utilizing contour data of each section sliced at a specified pitch of three-dimensional CAD model data of the target object desired to be formed, and the first parameter data stored in the first parameter database;

generating a second path as a removal processing path for the removal process, by utilizing the three-dimensional CAD model data, the second parameter data stored in the second parameter database, and removal timing data that designates a cutting depth performed in the removal process; and generating a driving program to drive the photo-shaping machine to execute the photo-shaping process including the light beam irradiation and the removal processes, by utilizing the first path data the second path data and the removal timing data, thereby performing the photo-shaping and removal process according to the driving program, wherein the second path generating divides the second path generated for the entire target object in a height direction at the removal timing data to generate adjacent paths, and generates an aerial route path connecting the adjacent paths, while ignoring a shape of the target object above an object range of the second path being generated.

2. A photo-shaping system which includes a photo-shaping machine for photo-shaping a target object along with a processor, said photo-shaping machine having a light irradiation means irradiating a light beam to a specified position of a powder material layer to sinter a desired part of the powder material layer to form a sintered layer, covering the sintered layer with a new powder material layer, irradiating a light beam to a specified position of the new powder material layer to sinter a desired part of the new powder material layer to form a new sintered layer integral with the underlying sintered layer, repeating the process of forming the sintered layers in lamination, and having a removal processing means removing an outer face of a formed body of the sintered layers in lamination during the repetitive forming process of the sintered layers, said processor comprising:

a first parameter database storing first parameter data for use in the photo-shaping process executed by the light irradiation means, the first parameter data including at least light beam irradiation spot diameter, light beam irradiation power and irradiation speed to be applied to a powder material;

a second parameter database storing second parameter data for use in a removal process executed by the removal processing means, the second parameter data including tool master data relating to the removal process and cutting process conditions of a tool to be used in the removal process;

first path generating means for generating a first path as a light beam irradiation path for the light irradiation means, by utilizing contour data of each section sliced at a specified pitch of three-dimensional CAD model data of the target object desired to be formed, and the first parameter data stored in the first parameter database;

second path generating means for generating a second path as a removal processing path for the removal processing means, by utilizing the three-dimensional CAD model data, second parameter data stored in the second parameter database, and removal timing data that designates a cutting depth performed in the removal process;

driving program generating means for generating driving programs for driving the photo-shaping machine and the removal processing means, by utilizing the first path data, the second path data and the removal timing data, whereby the photo-shaping machine and the removal processing means perform the photo-shaping and removal process according to the driving programs, wherein the second path generating means divides the second path generated for the entire target object in a height direction at the removal timing data to generate adjacent paths, and generates an aerial route path connecting the adjacent paths, while ignoring a shape of the target object above an object range of the second path being generated.

3. A computer program embodied on a computer-readable medium for executing a process of photo-shaping a target object executed by a photo-shaping machine along with a computing process, the photo-shaping process including irradiating a light beam to a specified position of a powder material layer to sinter a desired part of the powder material layer to form a sintered layer, covering the sintered layer with a new powder material layer, irradiating a light beam to a specified position of the new powder material layer to sinter a desired part of the new powder material layer to form a new sintered layer integral with the underlying sintered layer, repeating the process of forming the sintered layers in lamination, and removing an outer face of a formed body of the sintered layers in lamination during the repetitive forming process of the sintered layers, comprising:

storing first parameter data in a first parameter database for use in the light irradiation process, the first parameter data including at least light beam irradiation spot diameter, light beam irradiation power and irradiation speed to be applied to a powder material;

storing second parameter data in a second parameter database for use in a removal process, the second parameter data including tool master data relating to the removal process and cutting process conditions of a tool to be used in the removal process;

generating a first path as a light beam irradiation path for the light irradiation process, by utilizing contour data of each section sliced at a specified pitch of three-dimensional CAD model data of the target object desired to be formed, and the first parameter data stored in the first parameter database;

generating a second path as a removal processing path for the removal process, by utilizing the three-dimensional CAD model data, the second parameter data stored in the second parameter database, and removal timing data that designates a cutting depth performed in the removal process; and generating a driving program that drives the photo-shaping machine to execute the photo-shaping process including the light beam irradiation and the removal processes, by utilizing the first path data, the second path data and the removal timing data, thereby performing the photo-shaping and removal process according to the driving program, wherein the second path generating divides the second path generated for the entire target object in a height direction at the removal timing data to generate adjacent paths, and generates an aerial route path connecting the adjacent paths, while ignoring a shape of the target object above an object range of the second path being generated.

4. A photo-shaping system which includes a photo-shaping machine for photo-shaping a target object along with a processor, said photo-shaping machine having a light irradiator that irradiates a light beam to a specified position of a powder material layer to sinter a desired part of the powder material layer to form a sintered layer, covering the sintered layer with a new powder material layer, irradiating a light beam to a specified position of the new powder material layer to sinter a desired part of the new powder material layer to form a new sintered layer integral with the underlying sintered layer, repeating the process of forming the sintered layers in lamination, and having a removal processor that removes an outer face of a formed body of the sintered layers in lamination during the repetitive forming process of the sintered layers, said processor comprising:

a first parameter database that stores first parameter data for use in the photo-shaping process executed by the light irradiator, the first parameter data including at least light beam irradiation spot diameter, light beam irradiation power and irradiation speed to be applied to a powder material;

a second parameter database that stores second parameter data for use in a removal process executed by the removal processor, the second parameter data including tool master data relating to the removal process and cutting process conditions of a tool to be used in the removal process;

a first path generator that generates a first path as a light beam irradiation path for the light irradiator, by utilizing contour data of each section sliced at a specified pitch of three-dimensional CAD model data of the target object desired to be formed, and the first parameter data stored in the first parameter database;

a second path generator that generates a second path as a removal processing path for the removal processor, by utilizing the thee-dimensional CAD model data, second parameter data stored in the second parameter database, and removal timing data that designates a cutting depth performed in the removal process;

a driving program generator that generates a driving program that drives the photo-shaping machine and the removal processor, by utilizing the first path data, the second path data and the removal timing data, whereby the photo-shaping machine and the removal processor perform the photo-shaping and removal process according to the driving program, wherein the second path generator is configured to divide the second path generated for the entire target object in a height direction at the removal timing data to generate adjacent paths, and generates an aerial route path connecting the adjacent paths, while ignoring a shape of the target object above an object range of the second path being generated.

5. The photo-shaping system of claim 4, wherein said second path generator is configured to determine a removing tool to be used in the removal process executed by the removal processor, by utilizing the thee-dimensional CAD model data and the second parameter data stored in the second parameter database.

6. The photo-shaping system of claim 4, wherein the second path generator is configured to generate the removal timing data by utilizing the thee-dimensional CAD model data and the second parameter data stored in the second parameter database, and the second parameter data used in generating the removal timing data contains data relating to a downward overlapping amount of the cutting depth.

7. The photo-shaping system of claim 4, wherein the second path generator is configured to divide the three-dimensional CAD model in a height direction according to predetermined removal timing data, and to generate a second path by utilizing the divided model shapes and the second parameter data stored in the second parameter database.

8. The photo-shaping system of claim 7, wherein the second path generator is configured to make a model of an excess hardened portion generated in the photo-shaping, to determine a removing range by the obtained excess hardened model, and to generate a second path based on the removing range.

9. The photo-shaping system of claim 7, wherein the second path generator is configured to determine a removing range present between a lowest contour of the range specified by the removal timing data and an offset contour being offset outward from the lowest contour by a specified amount, and generates a second path based on the removing range.

10. The photo-shaping system of claim 7, wherein the second path generator is configured to generate a second path in each non-consecutive region in a divided model, and to generate an aerial route path linking the second paths.

11. The photo-shaping system of claim 4, wherein the second path generator is configured to determine a contact start position contacting a removing object portion depending on a tool shape contained in the second parameter database in the removal process executed by the removal processor used as a cutter, and to generate a second path by utilizing the contact start position.

* * * * *